UNITED STATES PATENT OFFICE.

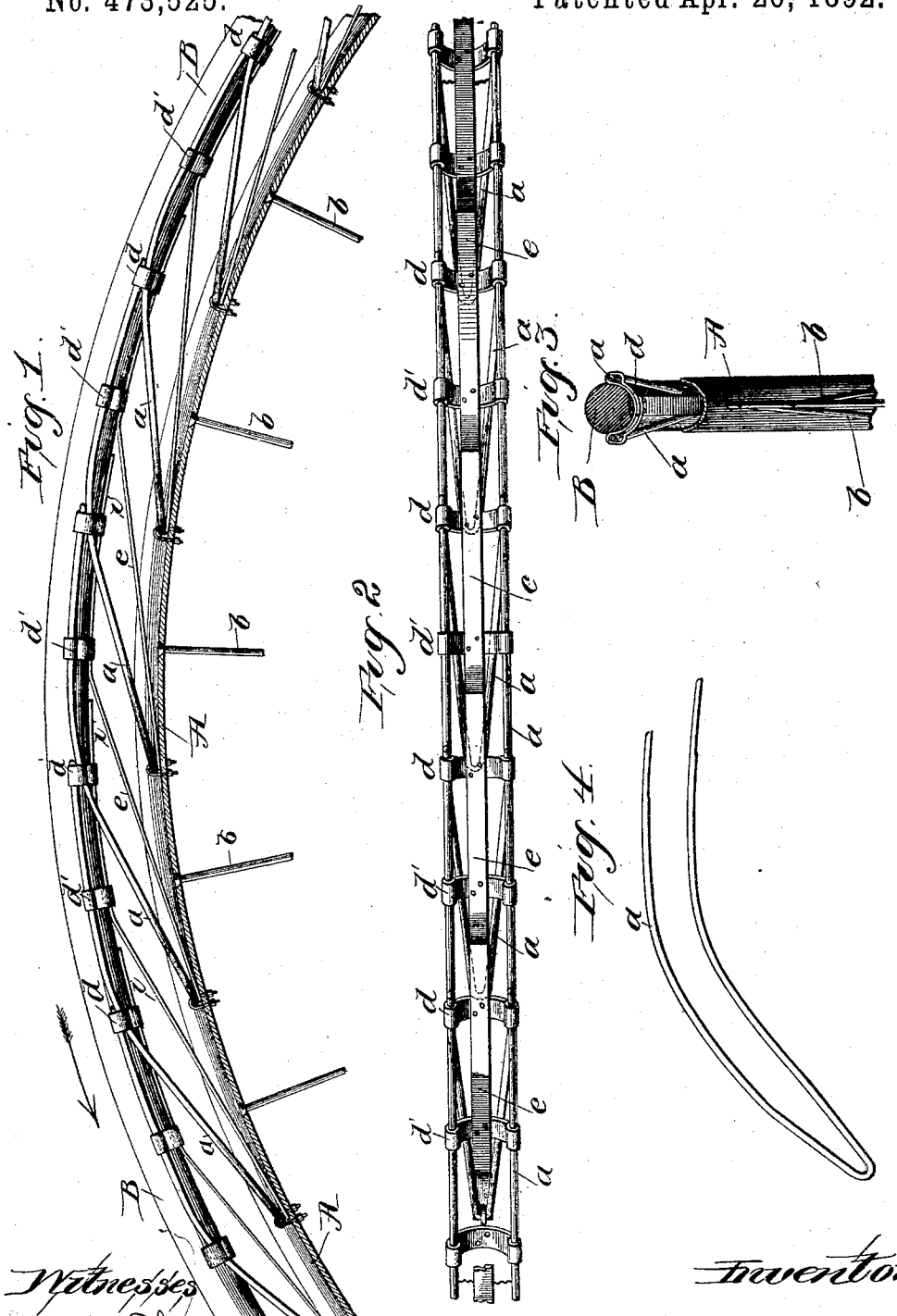

JOSEPH RIDGE, OF CHICAGO, ILLINOIS.

VEHICLE-WHEEL.

SPECIFICATION forming part of Letters Patent No. 473,525, dated April 26, 1892.

Application filed September 10, 1891. Serial No. 405,281. (No model.)

*To all whom it may concern:*

Be it known that I, JOSEPH RIDGE, of Chicago, county of Cook, and State of Illinois, have invented new and useful Improvements in Vehicle-Wheels, of which the following is a full and complete specification.

The purpose of my invention is to provide against vibration of a vehicle over uneven-surface roadways by the application of peripheral springs to the wheels.

I am aware that tubular rubber tires, with and without inflation, are in use for the purpose, but attended in the one form with partial success and in the other with lack of satisfactory practicability.

To obviate the difficulties found in the use of tubular rubber, I provide springs of metal or of other material possessing the required strength and flexible elasticity, a series of which are superimposed throughout the circumference of a wheel, as hereinafter set forth, whereby all the desired elasticity is obtained with durability equal to a wheel of ordinary construction.

For the purpose of description reference is had to the accompanying drawings, in which—

Figure 1 is a side view of a peripheral section of a wheel, the rim portion being shown in longitudinal section. Fig. 2 is a top view of the section, the tire being omitted. Fig. 3 is an end view showing the rim in full width. Fig. 4 is a detail showing one of the springs.

The rim A is of the usual construction used for velocipedes—*i. e.*, semicircular in cross-section—whereby in the ordinary wheel it is adapted to retain the cylindrical rubber tire. This form of rim I have retained, as a channel serves a purpose hereinafter named, in connection with springs used in my improvement, that makes it desirable.

Attached to the rim are shown the outer portions of spokes $b$. The series of springs by which the desired elasticity is obtained are lettered $a$. The springs are, as I believe, for velocipedes, preferably constructed of steel wire tempered, each of a single piece, as affording simplicity, lightness, and neatness, though for vehicles of a heavier kind flat or leaf springs might be preferable, especially so should it be desirable to have the springs also serve as a tire. The doubled ends of the springs are respectively secured to the bottom of the rim-channel by means of screw-threaded staples and nuts $c$, holes being drilled through the middle portion of the rim to receive the ends of the staples. The outer ends of each spring rest upon an adjacent spring about midway of the latter throughout the series. The primary metallic loops $d$, having a semicircular central portion as a tire-support, are so formed that each of its ends is adapted to loosely admit two thicknesses of wire, through which the branches of one spring and the ends of the superincumbent spring are respectively inserted, thus holding said springs in position with relation to each other and to the whole spring structure, and at the same time permitting a longitudinal movement of one spring upon another, which flexion of the springs under pressure slightly produces. Loops $d'$, intermediate between the loops $d$, are provided on each spring to serve in supporting the tire. The tendency of the loops to recede from their proper position on the springs, caused by the rotation of the wheel under pressure, necessitates fastening. This, in order not to interfere with the flexion of the springs, I accomplish by means of tie-straps $e$, in number equal to that of the springs, constructed from flexible strips of metal. These tie-straps, respectively, have one of their ends secured to the wheel-rim by means of staples $c$. The outer ends of the tie-straps are respectively secured by rivets to a pair of loops $d\ d'$. The tie-straps also incidentally serve to bridge alternate spaces between loops as additional support for the tire. The remaining spaces between loops may be partially or wholly bridged by extensions from the loops, as indicated at $i$, which extensions should be curved in cross-section to better withstand pressure. It is obvious that connections secured to both such loops would interfere with the action of the springs.

B represents the cylindrical rubber tire, which should have such tensile elasticity as to be readily restored when flexion occurs coincident with compression of the springs.

The doubled ends of springs $a$ fit closely in the rim-channel, which, in connection with loops $d$, serve to prevent lateral play or displacement of the springs.

The method of fastening by staples makes the connection of the springs with the rim a hinged one, thereby permitting the outer ends of said springs to bear with full force upon the subjacent ones, and thereby admitting of flexion throughout their entire length. Thus the springs as a whole possess all the softness that their size and temper permit. I however, if desirable, modify this by so shaping the doubled ends of the springs that the portions thereof entering the channel when inserted perpendicular to a tangent of the rim-curve fit closely. Thus, the spring being slightly wider from the rim outward, when it is brought to its proper inclined position a contact is formed between spring and rim that acts partially as a fulcrum, and thereby reduces the flexibility of the spring, thus adapting the cushioning qualities of the series to sustain greater weight. This may be further modified by tightening or loosening the staple-nuts.

The arrow indicates the direction in which the wheel should rotate, that the springs may have their desired action.

Having thus fully described my said invention, what I claim, and desire to secure by Letters Patent, is—

1. In a vehicle-wheel exterior to and secured to its rim, a series of overlapping springs, the outer ends thereof being free and successively supported one by another, whereby a continuous cushion is formed about the periphery of said wheel, substantially as specified.

2. In combination with rim A, the series of wire springs $a$, having their free ends joined by loops $d$, substantially as described.

3. In combination with rim A, the springs $a$, and flexible tire B, substantially as specified.

JOSEPH RIDGE.

Witnesses:
OSCAR A. REUM,
E. H. KOENIG.